INVENTORS:
Albert V. Mowrey
John Huiskes
Abraham Brand
By Smyth, Roston & Pavitt
ATTORNEYS

MAGNETIC HOLDDOWN FOR MAGNETIC DISC SYSTEM

Filed June 9, 1971

INVENTORS:
Albert V. Mowrey
John Huiskes
Abraham Brand
By Smyth, Roston & Pavitt
ATTORNEYS INVENTORS
Albert V. Mowrey
John Huiskes
Abraham Brand
By Smyth, Roston & Pavitt
ATTORNEYS United States Patent Office 3,706,085

Patented Dec. 12, 1972

3,706,085

MAGNETIC HOLDDOWN FOR MAGNETIC DISC SYSTEM

Albert V. Mowrey, Canoga Park, John H. Huiskes, Los Angeles, and Abraham Brand, Encino, Calif., assignors to General Instrument Corporation Filed June 9, 1971, Ser. No. 151,270
Int. Cl. G11b 5/82, 17/00
U.S. Cl. 340—174.1 C 16 Claims

ABSTRACT OF THE DISCLOSURE

A magnetic holddown system for providing at selected times a magnetic holddown of a magnetic disc wherein the disc includes a ring of magnetic material and wherein the disc is to be held on a spindle assembly in a magnetic disc recording and reproducing system. The spindle assembly includes a central spindle, a rim member and an interconnecting web portion and with the web portion including magnetic sections spaced apart by a nonmagnetic section. A stationary electromagnet is located below the spindle assembly and provides when energized a magnetic field to pass through the magnetic sections of the web portion to interact with the ring of magnetic material which is part of the magnetic disc to hold the magnetic disc against the spindle assembly. The stationary electromagnet is always energized when the motor driving the spindle assembly is energized. The stationary electromagnet is energized for a predetermined period of time after the motor driving the spindle assembly is de-energized and the stationary electromagnet is energized for a predetermined period of time when power is applied to the system but before the motor driving the spindle assembly is energized.

The present invention is directed to a magnetic holddown system for providing a magnetic holddown of a magnetic disc against a spindle assembly which is part of a magnetic disc recording and reproducing system.

In the prior art it has been found to be desirable to provide some means of holding a magnetic disc against a spindle assembly in a magnetic disc and recording system. This holddown has been provided mechanically in the prior art using a member which locks the disc in position but such mechanical locking structure is undesirable because it increases the mass of the rotating structure and because it limits the free and quick replacement of the magnetic discs.

It has been proposed in the prior art to use a magnetic holddown and such magnetic holddown has generally been accomplished using a rotating permanent magnet to maintain a magnetic force to hold the magnetic disc against the spindle assembly. However, such a rotating permanent magnet is undesirable because it increases the rotating mass and also since the permanent magnet always provides the magnetic force. The presence of the magnetic force makes it difficult to place the disc on the spindle since this magnetic force may pull the disc towards the spindle before the disc is properly positioned which could damage the disc.

In order to overcome the disadvantages of the prior art, the present invention uses an electromagnet which may be selectively energized so that the disc may be placed on the center spindle when no magnetic force exists and with the electromagnet energized at appropriate times to provide the magnetic holddown at the appropriate times. As a further advantage the present invention uses a stationary electromagnet to eliminate any slip rings so that the structure of the magnetic holddown is quite simple.

The apparatus of the present invention may include the use of a magnetic disc including a ring of magnetic material and with a spindle assembly including a central spindle and a rim member for supporting the magnetic disc for rotation. The spindle assembly may also have an interconnecting web portion intermediate the central spindle and the rim member and with the web section having spaced magnetic portions separated by a non-magnetic portion. A stationary electromagnet is located below the spindle assembly at a position intermediate the central spindle and the ring member and adjacent to the web section.

When the stationary electromagnet is selectively energized, a magnetic field is produced from the stationary electromagnet which has a path through one of the magnetic sections of the web portion, through the ring of magnetic material of the magnetic disc member and through the other of the magnetic sections of the web portion. In this way, a magnetic field is produced which provides for the magnetic holddown of the magnetic disc against the spindle assembly during the times of selective energization of the electromagnet.

For example, when power is initially applied to the magnetic disc recording and reproducing system, the electromagnet may be energized for a predetermined period of time such as 15 seconds to help in the seating of the disc member on the spindle assembly. For example, the disc member may be placed on the spindle assembly. The power may then be applied and with the electromagnet selectively energized for the period of time such as 15 seconds. This insures that the magnetic disc member is properly seated on the spindle assembly and allows for the removal of the carry case which may be used to store the magnetic disc member. A clearer understanding of the carry case will be had with reference to application Ser. No. 156,382 filed June 24, 1971, in the name of Albert V. Mowrey and assigned to the same asignee as the instance case. After the predetermined period of time such as 15 seconds, the electro magnet is de-energized and the magnetic disc is free to be removed if this is desired.

When the magnetic disc recording and reproducing system is started so as to have the disc rotated, the magnetic holddown is automatically actuated so as to provide for the magnetic holddown during rotation of the disc member. Specifically, when the power to the motor which drives the spindle assembly is energized the magnetic disc holddown is also energized. This insures that there is no slippage between the magnetic disc and the spindle assembly during operation of the magnetic disc recording and reproducing system.

When the power to the motor which drives the spindle assembly is de-energized it is desirable to maintain a magnetic holddown of the magnetic disc member to insure that the disc is maintained in position as the spindle assembly slows down. This is accomplished by providing for the continuation of the energization of the magnetic holddown for a predetermined period of time such as 15 seconds after the motor driving the spindle assembly is deactuated.

The present invention therefore provides at selected times a magnetic holddown of a magnetic disc in a magnetic disc recording and reproducing system. A clearer understanding of the invention will be had with reference to the following description and drawings wherein.

Figure 1:
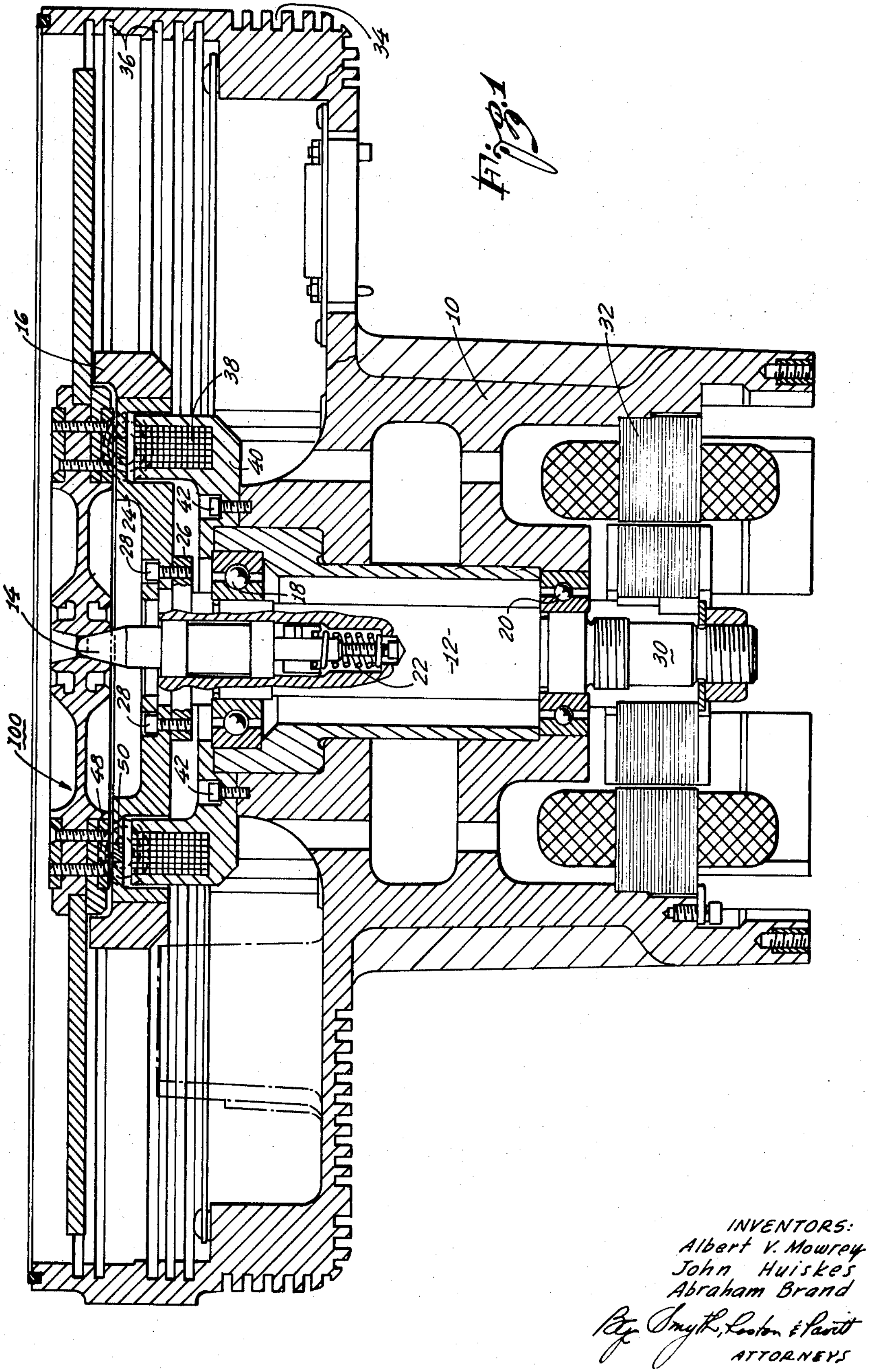
FIG. 1 represents a cross-sectional view of a structure providing a rotation of a magnetic disc and including a magnetic holddown of the present invention.

In FIG. 1 a cross-sectional view of the structure for supporting a magnetic disc 100 for rotation is shown. The structure includes a main casting 10 which support the various components for rotating the magnetic disc. Specifically, a spindle assembly 12 including a central spindle 14 and a rim member 16 is supported for rotation using upper and lower bearings 18 and 20.

The central spindle 14 may be spring loaded by spring loaded by spring member 22 so as to allow the central spindle 14 to be depressed to insure a proper seating of the magnetic disc 100 on the central spindle. The rim member 16 may be interconnected to the central spindle using a web portion 24. The web portion 24 is connected to a disc member 26 which forms part of the central spindle using bolts 28.

The entire spindle assembly 12 may be rotated by a motor including a rotor 30 and a stator 32. The design of the motor may be conventional and as can be seen in FIG. 1 the entire motor structure is located within the casting 10. The casting 10 may also include a plurality of fins 34 and 36 which are used to provide for heat dissipation.

Mounted within the casting 10 is a stationary electromagnet 38 which is formed as a toroidal winding and which s supported within a housing 40. The housing 40 may be secured to the casting 10 using bolt members 42. The electromagnet 38 extends within a recessed portion 44 within the web portion 24 of the spindle assembly 12. The electromagnet 38 when energized provides for a magnetic field 46 which extends out from the electromagnet 38 through the web portion 24 and to a magnetic portion 48 of the magnetic disc 100. The web portion of 24 also includes a nonmagnetic section 50 so as to insure that the path of the magnetic field 46 is through the magnetic portion 48 to provide for a magnetic holddown of the magnetic disc 100.

Figure 2:
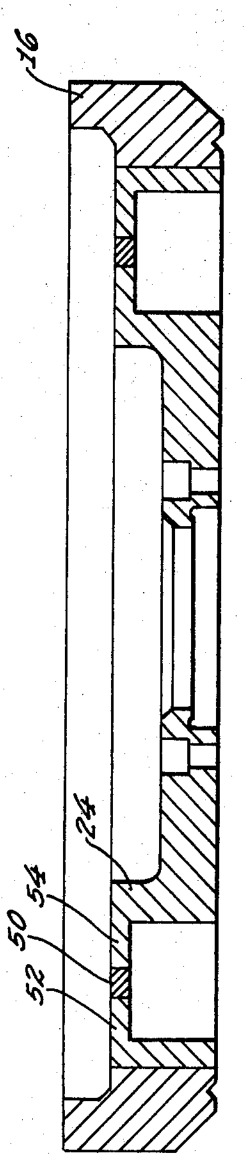
FIG. 2 illustrates a cross section of a portion of the spindle assembly of FIG. 1 which portion forms a part of a magnetic holddown apparatus.

A clearer understanding of the rim portion 16 and the web portion 24 of the spindle assembly can be seen with reference to FIG. 2. In FIG. 2 it can be seen that the rim portion 16 may be constructed of a separate member composed of a nonmagnetic material such as aluminum to minimize any flux from the magnetic field produced by the electromagnet 38 which might enter the magnetic disc. This is to insure that there is no disturbance of any information recorded on the magnetic disc. The web portion 24 includes metallic magnetic sections 52 and 54 which are separated by the nonmagnetic section 50. For example, the sections 52 and 54 may be composed of steel and the nonmagnetic portion 50 may be a copper ring. This is to provide an air gap so that the magnetic field produced by the electromagnet 38 takes the path of least resistance through the steel portions and is then directed outward so that a proper magnetic field is formed to provide the magnetic holddown.

Figure 3:
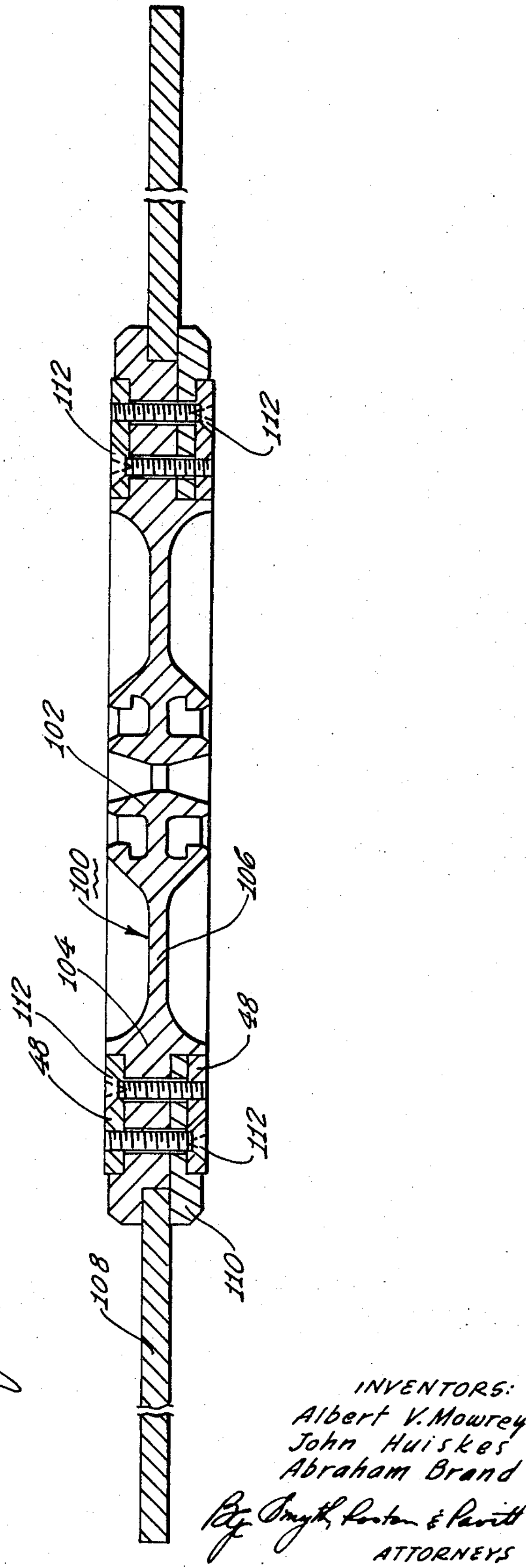
FIG. 3 illustrates a cross-sectional view of a magnetic disc used in the magnetic disc holddown of the present invention.

FIG. 3 illustrates the structure of the magnetic disc 100 in more detail and it can be seen in FIG. 3 that the magnetic disc 100 includes a center portion 102 which is used for supporting the magnetic disc on the center spindle 14. An outer portion 104 is interconnected by a web section 106 to the central portion 102. The outer portion 104 is used for supporting a magnetic recording disc 108. The magnetic recording disc 108 is locked in position using a member 110 which is bolted to the outer portion 104 using bolts 112.

As shown in FIGS. 1 and 3 the magnetic disc 100 also includes members 48 composed the magnetic material such as steel which members 48 are used to provide for the magnetic holddown of the magnetic disc on the spindle assembly 12. The magnetic field 46 produced by the electromagnetic magnet 38 passes through the magnetic sections 52 and 54 of the spindle assembly and enter into the adjacent one of the magnetic portions 48. The interaction of the electromagnet and the magnetic member 48 provides for the magnetic holddown of the magnetic disc against the spindle assembly.

It is to be appreciated that the electromagnet may be energized at selected times so that the magnetic disc may be inserted and removed from the spindle assembly with no magnetic force present. As indicated above, the prior art uses a rotating permanent magnet and it is difficult to place the disc on the spindle and to remove the disc from the spindle since the magnetic force is always present. The use of the electromagnet allows for the selective energization so that the disc may be placed on the spindle when no magnetic force exists.

Also, the present invention uses a stationary electromagnet located adjacent to and below the spindle assembly and with the magnetic force passing through a magnetic portion of the spindle assembly. This eliminates the need for any slip rings as would be necessary if the electromagnet were part of the spindle assembly. Also, the use of the stationary electromagnet reduces the rotating mass of the spindle assembly.

Figure 4:
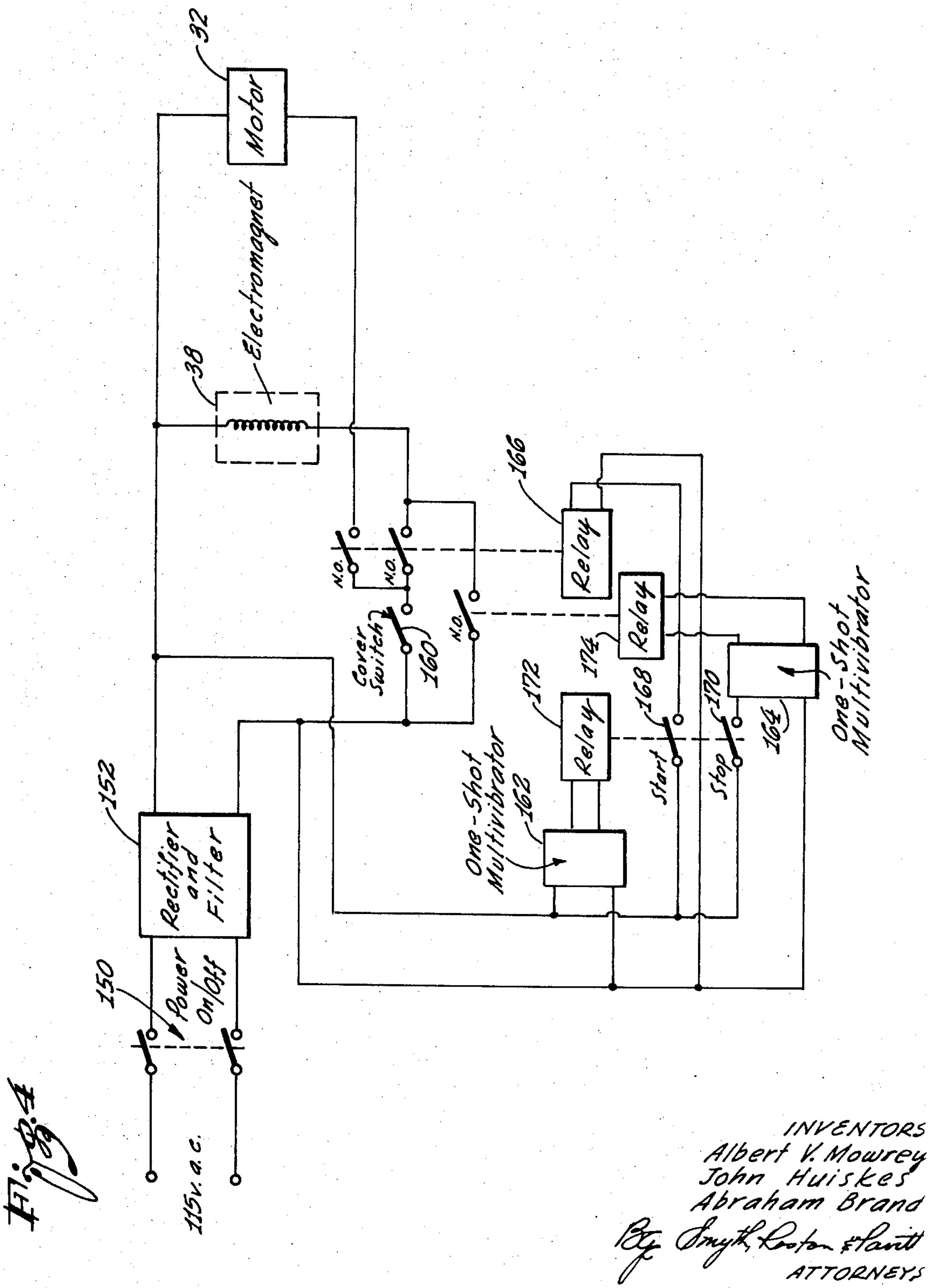
FIG. 4 illustrates a block diagram of a system for controlling the magnetic holddown of the present invention to be energized at selective times.

FIG. 4 illustrates in block diagram form a system for selectively energizing the electromagnet 38 in accordance with the application of power to the recording and reproducing system and in accordance with the energization of the windings 32 of the motor.

In FIG. 4 a line voltage such as 110 volts AC is applied through a double-pole, single-throw power switch 150 to a rectifier and filter circuit 152. The output from the rectifier and filter circuit 152 is applied through a series of relay controlled switches 154, 156, 158 and a cover switch 160 to the electromagnet 38 and the motor 32. The output from the rectifier and filter circuit 152 is also applied as an input to a pair of one-shot multivibrators 162 and 164 and to a relay 166. Start switch 168 and top switch 170 which are linked together are used to control the power to the relay 166 and the one-shot multivibrator 164. Finally, the one-shot multivibrator 162 controls a relay 172 and the one-shot multivibrator 164 controls a relay 174.

The one-shot multivibrator 162 may produce an output pulse to control the relay 172 and with such pulse having a short time duration so that the switches 168 and 170 are quickly switched to the position shown in FIG. 4. For example, when the power switch 150 is closed and the rectifier and filter circuit 152 produces an output signal the one-shot multivibrator 162 controls the relay 172 so that the start switch 168 is open and the stop switch 170 is closed. At that time the output from the rectifier and filter circuit 152 is applied to the one-shot multivibrator 164 through the stop switch 170.

The one-shot multivibrator 164 has an output pulse which is present for a predetermined time such as 15 seconds. The one-shot multivibrator 164 controls the relay 174 to maintain the switch 158 in a closed position. The switch 158 is normally open and when the output pulse from the one-shot 164 terminates after the predetermined period of time such as 15 seconds, the relay 164 is deactivated, and the switch 158 returns to its normally open position. It can be seen, therefore, that when the switch 150 is closed the switch 158 is also closed for a predetermined period of time such as 15 seconds. This closing of the switch 158 completes a circuit to the electromagnet 38 so that the electromagnet 38 is also operating for the predetermined period of time such as 15 seconds.

The activation of the electromagnet and therefore the magnetic holddown is used to facilitate the placement of the magnetic disc. For example, the magnet disc may be placed on the spindle assembly 12 shown in FIG. 1 using a carry case similar to that shown in copending application Ser. No. 156,382 filed in the name of Albert v. Mowrey and assigned to the same assignee as the instant case. In order to facilitate the removal of the carry case and to insure that the magnetic disc 100 is properly positioned on the spindle assembly 12 the power switch 150 may be closed so that the magnetic holddown is actuated for 15 seconds. The carry case may then be removed since the magnetic holddown maintains the magnetic disc 100 in the proper position on the spindle assembly 12.

After the predetermined period of time such as 15 seconds, the switch 158 opens and the electromagnetic 38 and therefore the magnetic holddown is deactivated. At this time, the magnetic disc may be removed if desired. Assuming now that the power switch 150 is on and that the predetermined period of time such as 15 seconds used to facilitate the placement of the magnetic disc has lapsed and it is now desired to start the spindle assembly 12 rotating using the motor 32. At this time, the start switch 168 is closed which also opens stop switch 170 since they are linked together.

When the switch 168 is closed power is applied to the relay 166 so as to close the normally open switches 154 and 156. When the switches 154 and 156 are closed, power is supplied to the electromagnet 38 and to the winding 32 of the motor, the spindle assembly 12 is rotated by the motor, the holddown provided by the electromagnet 38 is energized to insure that the magnetic disc 100 is held against the spindle assembly during the rotation of the spindle assembly and the magnetic disc. The magnetic holddown insures that there is no slippage between the magnetic disc 100 and the spindle assembly during recording or reproduction on the recording surface 108 of the magnetic disc. This is important since any slippage could result in inaccuracies in the recording or reproduction of information on the magnetic disc.

As a precautionary measure, a cover switch 160 is included in circuit with the switches 154 and 156. The cover switch 160 may be a switch which is activated when a cover is positioned over the recording disc. Such a cover would normally be hinged to the casting 10 shown in FIG. 1 and should be closed before the spindle assembly 12 and the magnetic discs 100 are allowed to rotate.

The system of FIG. 4 also incorporates a further precautionary measure in that the energization of the electromagnet 38 is continued for a predetermined time after the motor windings 32 are de-energized. This can be seen in FIG. 4 wherein the stop switch 170 may be activated to be in the position shown in FIG. 4 which, also, opens the switch 168 since the switches 168 and 170 are linked. When the switch 170 is closed power is removed from the relay 166 so that the switches 154 and 156 open. However, when the switch 170 is closed, this provides an input to the one-shot multivibrator 164 which controls the relay 174 to close the switch 158. At this time, although power has been removed from the motor winding 32, power is still continued to the electromagnetic 38 so that the magnet holddown continues while the spindle assembly 12 and the magnetic disc 100 are slowing down. This energization of the electromagnet 38 after the motor winding 32 is deactivated is for a predetermined period of time such as the period of 15 seconds provided by the one-shot multivibrator 164.

It is to be appreciated although a single one-shot multivibrator 164 has been shown having a period of 15 seconds this period may be varied. Also, the energization of the electromagnet 38 after the motor winding 32 has been de-energized and after the power switch 150 has been closed may have different periods and these different periods may be provided using a plurality of one-shot multivibrators.

It can be seen therefore, that the present invention is directed to a magnetic holddown using a stationary electromagnet which is energized at selected times so as to provide for the magnetic holddown of a magnetic disc against a spindle assembly during the rotation of the magnetic disc and for a period of time after the motor driving the spindle assembly has been de-energized. The magnetic holddown may also be energized for a period of time after power is applied to the magnetic disc recording and reproducing system. The magnetic holddown is accomplished using a stationary electromagnet located below and adjacent to the spindle assembly and specifically intermediate a rim portion and center spindle of the spindle assembly. In order to provide for the proper path for the field so that the magnetic field produced by the electric magnet properly maintains the magnetic disc in position the spindle assembly may include magnetic portions separated by a nonmagnetic portion which serves as an air gap.

Although the invention has been described with reference to a particular embodiment, it is to be appreciated that the invention is only to be limited by the appended claims.

What is claimed is:

1. An apparatus for providing at selected times a magnetic holddown of a magnetic disc including magnetic material in a magnetic disc recording and reproducing system including:

a spindle assembly including a central spindle and a rim member for supporting the magnetic disc for rotation and with the magnetic material of the magnetic disc located intermediate the center spindle and the rim member, a stationary electromagnet located below the spindle assembly and intermediate the central spindle and the rim member and at a position to interact with the magnetic material of the magnetic disc, and means coupled to the stationary electromagnet for selectively energizing the electromagnet to provide a magnetic field to interact with the magnetic material to hold down the magnetic disc on the spindle assembly.

2. The magnetic holddown apparatus of claim 1 additionally includes a motor for driving the spindle assembly and wherein the stationary electromagnet is always energized when the motor driving the spindle assembly is energized.

3. The magnetic holddown apparatus of claim 1 additionally including a power switch to control the application of power to the magnetic disc recording and reproducing system and wherein the stationary electromagnet is energized for a predetermined period of time after the power switch is closed to provide power to the magnetic disc recording and reproducing system.

4. The magnetic holddown apparatus of claim 1 additionally including a motor for driving the spindle assembly and wherein the stationary electromagnet is energized for a predetermined period of time after the motor driving the spindle assembly is de-energized.

5. An apparatus providing at selected times a magnetic holddown of a magnetic disc including a ring of magnetic material in a magnetic disc recording and reproducing system, including:

a spindle assembly including a central spindle and a rim member for supporting the magnetic disc for rotation with the spindle assembly including a web member located intermediate the central spindle and the rim member and with the web member including magnetic sections separated by a non-magnetic section and with the ring of magnetic material of the magnetic disc located adjacent the web member when the magnetic disc is centered on the spindle assembly, a stationary electromagnet located below the spindle assembly and adjacent the web member to provide a magnetic path to the ring of magnetic material of the magnetic disc through the magnetic sections of the web member, and means coupled to the stationary electromagnet for selectively energizing the electromagnet to provide a magnetic field to hold down the magnetic disc on the spindle assembly.

6. The magnetic holddown apparatus of claim 5 additionally including a motor for driving the spindle assembly and wherein the stationary electromagnet is always energized when the motor driving the spindle assembly is energized.

7. The magnetic holddown apparatus of claim 5 additionally including a power switch to control the application of power to the magnetic disc recording and reproducing system and wherein the stationary electromagnet is energized for a predetermined period of time after the power switch is closed to provide power to the magnetic disc recording and reproducing system.

8. The magnetic holddown apparatus of claim 5 additionally including a motor for driving the spindle assembly and wherein the stationary electromagnet is energized for a predetermined period of time after the motor driving the spindle assembly is de-energized.

9. A magnetic holddown system for providing at selective times a magnetic holddown of a magnetic disc including magnetic material against a spindle assmebly in a magnetic disc recording and reproducing system, including:

an electromagnet located adjacent to the spindle assembly and with a magnetic path from the electromagnet through the magnetic material of the magnetic disc when the magnetic disc is positioned on the spindle assembly, first means coupled to the electromagnet for energizing the electromagnet to provide a magnet field interacting with the magnetic material of the magnetic disc to hold the magnetic disc against the spindle assembly, and second means coupled to the first means for controlling the first means to energize the electromagnet at selected times during the operation of the magnetic disc recording and reproducing system.

10. The magnetic holddown system of claim 9 additionally including a motor for driving the spindle assembly and wherein the electromagnet is always energized when the motor driving the spindle assembly is energized.

11. The magnetic holddown system of claim 9 additionally including a power switch to control the application of power to the magnetic disc recording and reproducing system and wherein the electromagnet is energized for a predetermined period of time after the power switch is closed to provide power to the magnetic disc recording and reproducing system.

12. The magnetic holddown system of claim 9 additionally including a motor for driving the spindle assembly and wherein the electromagnet is energized for a predetermined period of time after the motor driving the spindle assembly is de-energized.

13. A magnetic holddown system providing at selected times a magnetic holddown of a magnetic disc including a ring of magnetic material in a magnetic disc recording and reproducing system, including:

a spindle assembly including a central spindle and a rim member for supporting the magnetic disc for rotation, a stationary electromagnet located adjacent to the spindle assembly and with a magnetic path from the electromagnet through the ring of magnetic material of the magnetic disc when the magnetic disc is in position on the spindle assembly, first means coupled to the electromagnet for energizing the electromagnet to provide a magnetic field for interacting with the ring of magnetic material of the magnetic disc to hold the magnetic disc against the spindle assembly, and second means coupled to the first means for controlling the first means to energize the electromagnet at selected times during the operation of the magnetic disc recording and reproducing system.

14. The magnetic holddown system of claim 13 additionally including a motor for driving the spindle assembly and wherein the electromagnet is always energized when the motor driving the spindle assembly is energized.

15. The magnetic holddown system of claim 13 additionally including a power switch to control the application of power to the magnetic disc recording and reproducing system and wherein the electromagnet is energized for a predetermined period of time after the power switch is closed to provide power to the magnetic disc recording and reproducing system.

16. The magnetic holddown system of claim 13 additionally including a motor for driving the spindle assembly and wherein the electromagnet is energized for a predetermined period of time after the motor driving the spindle assembly is de-energized.

References Cited

UNITED STATES PATENTS

| | | | |
|---|---|---|---|
| 3,593,327 | 7/1971 | Schill | 340—174.1 C |
| 3,430,966 | 3/1969 | Gregg | 346—137 |
| 3,309,094 | 3/1967 | Stenton | 274—39 R |
| 3,047,869 | 7/1962 | Marcom et al. | 346—74 MO |

VINCENT P. CANNEY, Primary Examiner

U.S. Cl. X.R.

274—39; 346—137